Nov. 17, 1925.

A. M. DUFFIE 1,561,706

ELECTRIC WATER HEATER

Filed June 5, 1923

Inventor.
Allen M. Duffie.
by Popp and Powers,
Attorneys.

Patented Nov. 17, 1925.

1,561,706

UNITED STATES PATENT OFFICE.

ALLEN M. DUFFIE, OF BUFFALO, NEW YORK, ASSIGNOR TO WILLIAM H. ROBINSON, OF BUFFALO, NEW YORK.

ELECTRIC WATER HEATER.

Application filed June 5, 1923. Serial No. 643,560.

*To all whom it may concern:*

Be it known that I, ALLEN M. DUFFIE, a citizen of the United States, residing at Buffalo, in the county of Erie and State of New York, have invented a new and useful Improvement in Electric Water Heaters, of which the following is a specification.

This invention relates to improvements in electric water heaters, proposing a heater which is especially intended for use in connection with a domestic storage tank such as the usual boiler of a furnace or range.

The principal objects of the invention are to provide an electrical heater which will operate with high efficiency and with low current consumption, which will not be liable to derangement, and in which the heating element is readily accessible as occasion may require.

With the above objects in view, the heater is so constructed that the flowing stream is definitely divided into several rapidly moving convection currents each subject to the heat developed throughout the full extent of the heating element whereby the water is rapidly heated to a high degree and a rapid circulation between the heater and the storage tank is effected; the heater is also so constructed that loss of heat by absorption is reduced to a minimum and that the fullest benefits of radiation and of the conductivity of the tubes for the convection currents are obtained; the heater is also so constructed that the heating element is thoroughly protected against contact with metallic parts, and together with the parts by which it is supported is readily removable and replaceable as a unit with reference to the other parts of the heater structure.

The invention consists generally in certain novel features of structure, combination and organization which will be set forth in detail as the description proceeds.

An embodiment of the invention is illustrated in the accompanying drawing wherein.

Figure 1:
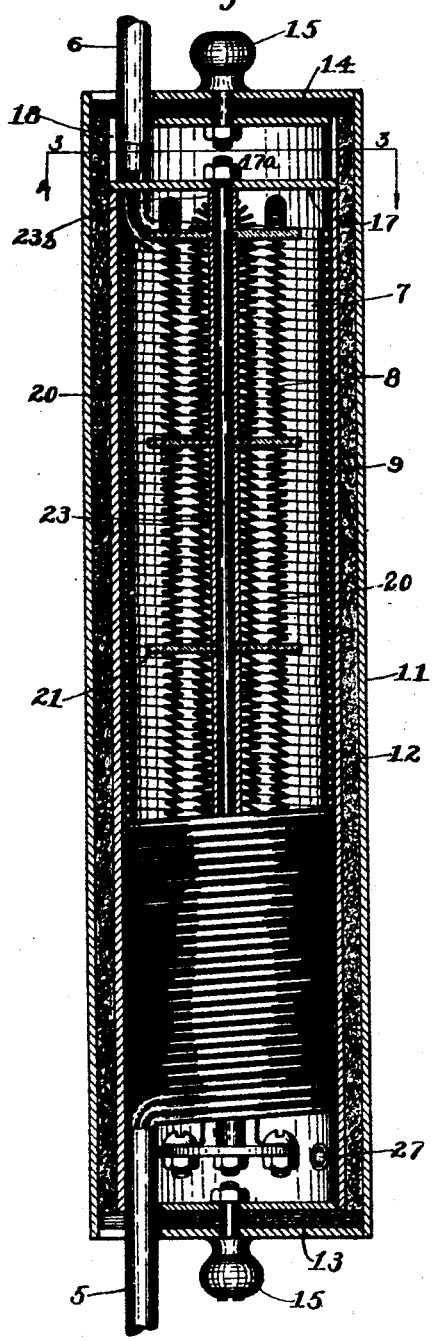
Figure 1 is a vertical sectional view of the heater.
Figure 2:
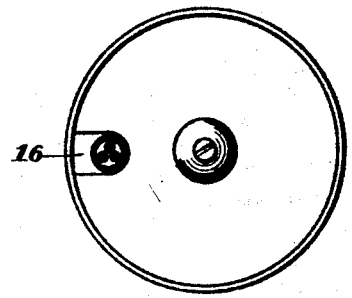
Figure 2 is a plan view.
Figure 3:
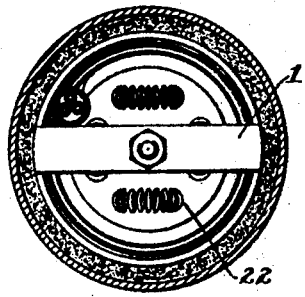
Figure 3 is a horizontal section view on the line 3—3 of Figure 1.
Figure 4:
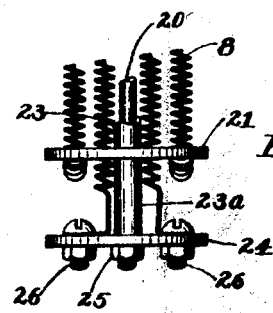
Figure 4 is a detail elevation of the lower portion of the support for the heating element.

Water is conducted from the storage tank (not shown) to the heater by a pipe 5 and is returned from the heater to the storage tank by a pipe 6. The heater is characterized by a plurality of convolute conductors 7, preferably of copper, which extend between and are supported by the pipes 5 and 6, the conductors 7 being each of small diameter as compared with the diameter of the pipes 5 and 6 and being helically wound with their convolutions lying in close adjacency whereby to provide a cylindrical structure through which the separate streams of water flow spirally, the pitch of the convolutions being selected to provide for the maximum heating surface and extent of travel of the water with reference to the length of the heater. The tubes 7 may be provided in any desired number. As shown and preferred, three of such tubes are used. The cylinder composed of the tubes 7 surrounds a heating element 8 and is in turn surrounded by a cylindrical reflector 9, the inner face of which is highly polished. Each tube is thus subject throughout its extent to the heat radiated by the element 8 and reflected by the cylinder 9. The heating element 8 preferably consists of coiled nichrome wire bent into parallel convolutions each extending substantially the full length of the cylinder provided by the tubes 7, the number of convolutions being a matter of choice and being determined in accordance with the requirements of the heater. As shown eight of such convolutions are provided.

The cylinder 9 is secured as by bolt and nut fastenings (not shown) to an outer supporting shell 11 which may be attached to any stationary support; and the space between the cylinder 9 and the shell 11 is filled with a cylinder 12 of heat insulating material such as compressed asbestos packing. The cylinder 9 delimits a heating chamber which is completely enclosed, its closure being completed by a bottom head 13 and a top head 14. The heads 13 and 14 are formed to fit frictionally and securely within the ends of the shell 11 and are provided with handles 15 for their ready removal from said shell and with recesses 16 which affords clearances for the pipes 5 and 6 respectively. The heads 13 and 14 are provided in their inner sides with metal plates having highly polished surfaces for the purpose of reflection and beyond said plates are provided with layers of compressed heat insulating material.

The element 8 is preferably supported from the cylinder 9 by means of a bridge bar 17, the ends of which are removably fitted in recesses 18 open to the upper edge of said cylinder. The bridge bar 17 supports by means of a nut 17$^a$ a centrally arranged hanger post 20 upon which are mounted at suitable intervals rigid plates 21 of compressed fiber or other suitable insulating material, these plates having openings 22 through which the convolutions of the element 8 extend, thereby serving positively to hold these convolutions spaced from one another. The plates 21 are mutually spaced and supported by spacer sleeves 23 fitted on the post 20. At the lower end of the post 20, a plate 24 is supported by means of a nut 25. The plate 24 is arranged below the lowermost plate 21 and the latter is supported by a spacer sleeve 23$^a$ fitted on the post similarly to the sleeves 23. The plate 24 is of insulating material similar to the plates 21 and is provided with binding posts 26 which serve for the connection of the terminals of the element 8 and of the line wires, these, suitably insulated, being extended through an opening 27 in the cylindrical wall of the heater near its lower end. The uppermost plate 21 is arranged at a suitable distance below the bar 17 from which it is spaced by a sleeve 23$^b$ mounted on the post 20 and the convolutions of the elements 8 are connected by portions which are threaded through the openings 22 of the uppermost and lowermost plates 21.

It will be seen that the heating element and its supporting parts are assembled as a self-contained unit, wherein the post 20 with the cooperation of the nuts 17$^a$ and 25 provides a mounting for all of the remaining supporting parts and these in turn carry the element 8 and positively maintain the proper spacing of the convolutions thereof from one another and from the tubes 7. The removal of the heating element is effected by removing the heads 13 and 14, disconnecting the line wires from the terminals 26 and by means of the bridge bar 17 lifting the unitary structure from the heating chamber.

The conductors 7 divide the water which passes through the heater into separate convection streams of small volume, which streams flow through a common heating chamber, wherein each stream is subject to heat developed by the element 8 throughout the full extent thereof and transmitted by direct or reflected radiation to the highly conductive conduit by which the streams are confined and directed. In this way it is possible to heat a volume of water sufficient for normal domestic uses in a comparatively short time to a suitably high degree with a minimum consumption of electric current.

Having fully described my invention, I claim:

1. In an electric water heater, in combination, a cylinder delimiting a heating chamber closed at its ends, an inlet pipe and an outlet pipe arranged at the opposite ends of said heater, a plurality of tubes connected to said pipes and having convolutions lying closely adjacent one another and arranged to form a cylinder which is fitted within said cylinder first named, said tubes being each of small diameter as compared with said pipes, and an electrical heating element arranged within the cylinder formed by said tubes.

2. In an electric water heater, in combination, a cylinder delimiting a heating chamber closed at its ends, said cylinder having an internal reflecting surface, an inlet pipe and an outlet pipe arranged at the opposite ends of said heater, a plurality of tubes connected to said pipes and having convolutions lying closely adjacent one another and arranged to form a cylinder which is fitted within said cylinder first named, said tubes being each of small diameter as compared with said pipes, and an electrical heating element arranged within the cylinder formed by said tubes.

3. In an electric water heater, in combination, a cylinder delimiting a heating chamber closed at its ends, an inlet pipe and an outlet pipe arranged at the opposite ends of said heater, a water conducting medium connected to said pipes and having the form of a cylinder fitted within said cylinder first named, an electrical heating element arranged within the cylinder formed by said conducting medium, and supporting means for said heating element including a bridge bar removably supported at the upper end of said heating chamber and from which said heating element and the other supporting parts therefor are suspended.

4. In an electric water heater, in combination, a cylinder delimiting a heating chamber having a removable end closure, an inlet pipe and an outlet pipe arranged at the opposite ends of said heater, a water conducting medium connected to said pipes and having the form of a cylinder fitted within said cylinder first named, an electrical heating element arranged within the cylinder formed by said conducting medium, and a support for said heating element, said support and said heating element being organized as a unit removable from said heating chamber upon the removal of said end head.

5. In an electric water heater, in combination, a cylinder delimiting a heating chamber having a removable end closure, an inlet pipe and an outlet pipe arranged at the opposite ends of said heater, a water conducting medium connected to said pipes and having the form of a cylinder fitted within said cylinder first named, an electrical heating element arranged within the cylinder formed by said conducting medium, and supporting means for said heating element comprising a bridge bar removably supported at the upper end of said heating chamber, a central post pendent from and supported by said bridge bar, and insulating plates arranged at regular intervals on said post and having openings through which the convolutions of said heating element extend.

6. In an electric water heater, in combination, a cylinder delimiting a heating chamber closed at its ends, an inlet pipe and an outlet pipe arranged at the opposite ends of said heater, a water conducting medium connected to said pipes and having the form of a cylinder fitted within said cylinder first named, an electrical heating element arranged within the cylinder formed by said conducting medium, and supporting means for said heating element including a bridge bar removably supported upon the upper end of said cylinder first named and from which said heating element and the other supporting parts therefor are suspended.

7. In an electric water heater, in combination, a cylinder delimiting a heating chamber having a removable end closure, an inlet pipe and an outlet pipe arranged at the opposite ends of said heater, a water conducting medium connected to said pipes and having the form of a cylinder fitted within said cylinder first named, an electrical heating element arranged within the cylinder formed by said conducting medium, and a support for said heating element, said support and said heating element being organized as a unit removable from said heating chamber upon the removal of said end head and said support including a part which has supporting engagement upon the upper end of said cylinder first named.

In testimony whereof I affix my signature.

ALLEN M. DUFFIE.